United States Patent [19]
Amann

[11] 3,835,642
[45] Sept. 17, 1974

[54] GAS TURBINE UNLOADER

[75] Inventor: Charles A. Amann, Bloomfield Hills, Mich.

[73] Assignee: General Motors Corporation, Detroit, Mich.

[22] Filed: Nov. 20, 1972

[21] Appl. No.: 308,137

[52] U.S. Cl. .......................... 60/39.16 R, 417/319
[51] Int. Cl. ......... F02c 3/10, F02c 7/02, F02c 7/32
[58] Field of Search ............................. 60/39.16 ST

[56] References Cited
UNITED STATES PATENTS

| | | | |
|---|---|---|---|
| 2,949,731 | 8/1960 | Hambling | 60/6 |
| 2,960,825 | 11/1960 | Sampietro | 60/39.16 SI |
| 3,100,378 | 8/1963 | Austin | 60/39.16 SI |
| 3,514,945 | 6/1970 | Austin | 60/39.16 SI |
| 3,626,692 | 12/1971 | Kumm | 60/39.16 SI |
| 3,657,881 | 4/1972 | Amann | 60/39.16 SI |
| 3,771,916 | 11/1973 | Flanigan | 417/319 |

Primary Examiner—Clarence R. Gordon
Attorney, Agent, or Firm—Paul Fitzpatrick

[57] ABSTRACT

A gas turbine engine of a gas-coupled type suited for driving a vehicle has auxiliary devices such as an air conditioning compressor and a generator driven by the gas generator turbine. To facilitate acceleration of the gas generator and thus acceleration of the vehicle from idling or low power condition, these auxiliary devices are temporarily declutched from the engine during such acceleration.

3 Claims, 2 Drawing Figures

GAS TURBINE UNLOADER

My invention is directed to improvements in gas turbine engines and particularly to means for improving the acceleration characteristics of such engines by temporarily declutching power consuming auxiliaries from the engine during acceleration of the gas generator or engine.

There has been great interest in the application of gas turbine prime movers to vehicles such as tractors, buses, trucks, passenger automobiles, and various off-road machines. One drawback of typical gas turbine engines, particularly for passenger automobiles, is the relatively long time required for the engine to come to full power from an idling condition as compared, for example, to the usual gasoline or diesel internal combustion engine.

Usually, a gas turbine of the gas-coupled type is proposed for such service. A gas-coupled engine is one in which one turbine drives a compressor which supplies air to a combustion apparatus in which fuel is burned and the combustion products are supplied to the turbine. This combination of compressor, combustion apparatus, and turbine is called a gas generator. It supplies hot motive fluid to a second turbine which drives the external load and may be called a power turbine. It is possible to have the two turbines in parallel or to have the power turbine in series ahead of the gas generator turbine, but usually the power turbine is supplied through the gas generator turbine.

It is also possible to use a single shaft engine, in which a single turbine drives both the compressor and the external load. The principal drawback of this sort of engine is the need for a more flexible or complicated power transmission from the engine to the load, since it is not feasible for the engine to idle below about one-half speed. In the gas-coupled engine, the power turbine may be at standstill with the gas generator operating at idle or above.

In the automobile installation, and in other cases as well, it is usually necessary for the prime mover to drive various power-consuming devices. These include, of course, the fuel and lubricating oil pumps of the engine, which must be driven continuously during normal operation of the engine. It also may include certain vehicle auxiliaries such, for example, as a power steering pump which should be kept constantly in operation.

There are other auxiliary devices, some of which may consume quite substantial power, the operation of which may be dispensed with for brief periods. These include particularly the generator which keeps the battery of the vehicle charged and an air conditioning compressor in the usual automobile.

The time lag from idle condition to full speed or power of a gas turbine engine is increased by the presence of any load on the gas generator turbine. For this reason, it has generally been the practice to drive such devices as the generator and air conditioning compressor from the power turbine. In this case, however, it becomes necessary to include means to allow the power turbine to turn at low speed even when the vehicle is stationary so that these devices are not put out of service for substantial periods of time when the vehicle is standing. For this reason, it is preferable to drive all the auxiliary devices from the gas generator turbine which always is operating except when the power plant is shut down and which has a much narrower range of speed, usually from about 50 to 100 percent maximum rated during normal operation of the vehicle. My invention is directed to the provision of means which will make it feasible to operate all auxiliary devices from the gas generator turbine or from the single turbine of a single shaft engine while minimizing the penalty in engine acceleration exacted by loading the engine with them during acceleration.

In the preferred embodiment of my invention, such auxiliaries as may be temporarily disconnected, such as the air conditioning compressor or generator, are temporarily declutched from the gas generator turbine during acceleration of the engine in response to some signal indicating a demand by the operator of the vehicle for such acceleration of the engine.

The principal objects of my invention are to increase the simplicity and practicability of gas turbine power plants for vehicular applications, to facilitate driving auxiliary devices from a gas generator turbine, and to provide means for minimizing temporarily the power drain of auxiliary devices from the engine during acceleration of the compressor-driving turbine.

The nature of my invention and its advantages will be further apparent to those skilled in the art from the succeeding detailed description of preferred embodiments of the invention and the accompanying drawings thereof.

Figures 1, 2:
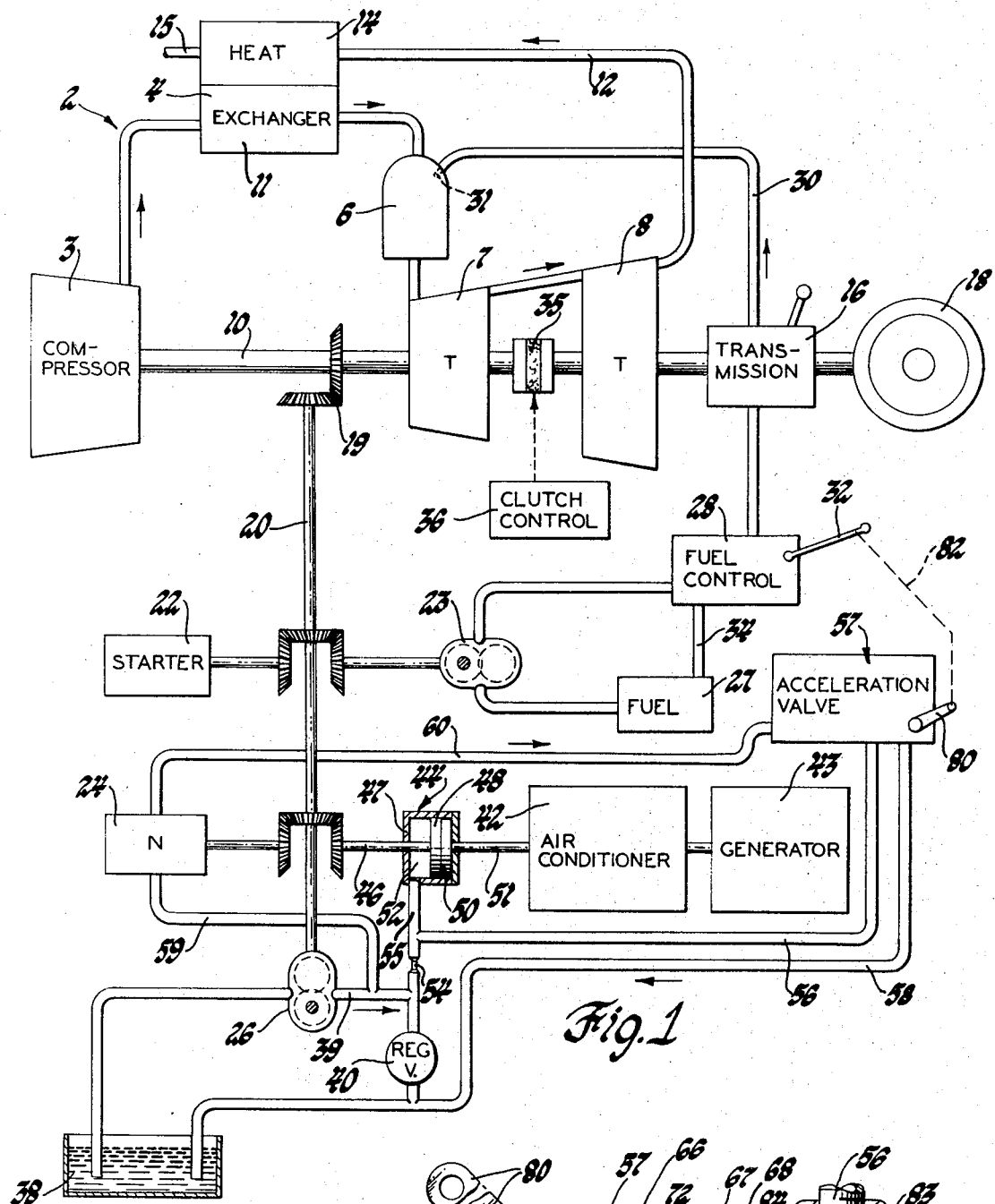
FIG. 1 is a schematic diagram of a gas turbine vehicle propulsion installation embodying the invention.
FIG. 2 is a longitudinal sectional view of an acceleration valve employed in the system.

Referring first to FIG. 1, the engine or power plant 2 includes a compressor 3, a heat exchanger 4, a combustion apparatus 6, a high pressure turbine 7, and a low pressure turbine 8. The high pressure turbine is connected by a shaft 10 to drive the compressor 3. Air delivered by this compressor flows through the high pressure pass 11 of the heat exchanger, through the combustion apparatus, through the turbines 7 and 8, through ducting 12, and through the low pressure pass 14 of the heat exchanger to an exhaust outlet 15. The low pressure turbine 8 is connected through a suitable manual or automatic transmission 16 to driving wheels 18 of the vehicle. The heat exchanger 4 may be omitted. Its presence or absence is immaterial to the present invention.

Accessory drive gears 19 connect the gas generator shaft 10 to an accessory drive shaft 20 which is directly connected through suitable gearing, indicated schematically, to such devices as a starter 22, an engine fuel pump 23, a speed transducer 24, and a lubricating oil pump 26. The fuel pump 23 draws fuel from a tank 27 and supplies it by way of a fuel control 28 and a fuel line 30 to a fuel nozzle 31 in the combustion apparatus. The fuel control may be of any suitable known type which acts to control the fuel supplied to the engine to avoid overspeed, overtemperature, flameouts, and compressor surge, and which is adjustable or settable by a suitable manual or foot control indicated at 32 to set the power level of the engine from idle to full power. The details of such controls are immaterial to this invention. Ordinarily, such controls return the excess fuel supplied by pump 23 to the fuel tank through a fuel return line 34.

While details of structure of the engine are immaterial to this invention, it might be pointed out that the engine might be generally as described in any of the following U.S. Pat. Nos.: Amann et al., 3,116,605, Jan. 7, 1964; Collman et al., 3,267,674, Aug. 23, 1966; and Bell, 3,490,746, Jan. 20, 1970.

The engine may include the power transfer feature described and claimed in Flanigan et al., U.S. Pat. No. 3,237,404, Mar. 1, 1966. The power transfer is a means for controllably transferring power from the compressor-driving turbine to the load-driving turbine so as to maintain higher temperatures in the gas generator turbine at low power levels and thus improve engine fuel economy under these conditions. This is represented schematically in FIG. 1 by a power transfer clutch 35 between the two turbines and a clutch control 36 which operates to vary the friction of the clutch by controlling the pressure of hydraulic fluid acting to engage the clutch. This is not further described, since it is also immaterial to my invention and is fully described in the Flanigan et al patent.

The oil pump 26 may supply lubricating oil to the engine and transmission through circuits not illustrated here and also delivers oil as a servo fluid for various purposes. So far as this is material to the present invention, pump 26 draws oil or other suitable fluid from a sump 38 and delivers it to an output line 39 the pressure of which is controlled by a pressure relief or pressure regulating valve 40, which returns oil to the sump as necessary to maintain substantially constant oil delivery pressure. As illustrated in the schematic, an air conditioning compressor 42 and a generator or alternator 43 which serves to maintain the vehicle battery charged are connected through a clutch 44 to a shaft 46 driven by the accessory drive shaft and gearing 20. The clutch is normally engaged but is disengaged to facilitate acceleration of the gas generator.

The clutch 44 illustrated schematically may be considered to embody a housing 47 enclosing shaft 46 splined to a first plate or set of plates 48 which may engage a plate or plates 50 within the housing and drivingly connected through shaft 51 to the air conditioner and generator. Engagement of the clutch is effected by supplying servo fluid under pressure to a chamber 52 within the clutch housing 47. The details of the clutch are immaterial; such clutches are common in various power transmission devices. One example is the clutch illustrated in FIG. 2 of the Flanigan et al. patent.

The servo fluid supplied through line 39 by pump 26 is throttled through an orifice 54 into a line 55 leading to chamber 52. A branch line 56 leads from chamber 52 to the acceleration valve 57, which is shown also in FIG. 2. The acceleration valve includes means to connect line 56 to a return line 58 to the sump 38 and thus relieve the pressure on clutch plate or plates 48 and thereby declutch shaft 51 from shaft 46. This may be accomplished through the use of the speed transducer 24 which develops a pressure indicative of speed of the gas generator shaft 10. The speed transducer takes servo oil under controlled pressure through a branch line 59 and delivers oil at a modulated pressure through a line 60 to the acceleration valve 57. The pressure increases with gas generator speed. The speed transducer may be of any suitable form, the preferred one being that described in the Flanigan et al. patent.

As shown more clearly in FIG. 2, the acceleration valve 57 includes a valve body 66 having a bore 67 coaxial with a second bore 68 of slightly larger diameter. A valve spool 70 slidable in the bore 68 normally abuts the shoulder at the end of the bore. A spring abutment 71 is slidable in the bore 67, and a compression spring 72 is retained between this and the valve spool. Spring 72 biases the spool 70 to the right as illustrated in opposition to oil pressure in a chamber 74 indicative of gas generator speed supplied from the speed transducer 24 through line 60. Chamber 74 is closed by a head 75 and the other end of the valve body is closed by a head or cap 76. Abutment 71 bears against an eccentric or cam 78 fixed to a shaft 79 rotated in the body by an arm 80. Arm 80 is connected by any suitable means, indicated by the broken line 82 in FIG. 1, to the throttle or power control lever 32. The throttle setting or gas generator speed command thus, through cam 78, determines the loading of spring 72 biasing valve spool 70 against the pressure in chamber 74 determined by actual gas generator speed. In normal operation of the engine, the speed signal is sufficient to hold the spool against the shoulder in the bore or substantially in this position. Clutch control line 56 enters the valve body through a port 83 which aligns with a groove 84 of the valve spool.

An increase in the loading of spring 72 tends to move valve spool 70 to the right as illustrated to bring groove 84 into registry with a bleed port 86 connecting through outlet 58 to the oil sump. Slight movements of the throttle lever 32 will not shift the valve spool sufficiently to drain or relieve pressure in the clutch cylinder, but more substantial differences between the speed setting and actual speed will release fluid from clutch 44, thus unloading the gas generator and improving its acceleration. Chambers within the bore 67 are vented to the sump through passages 87 and 88.

It will be apparent that many other arrangements for unloading or releasing the clutch 44 might be employed. For example, a switch responsive to travel of the power control lever to full power position might open a solenoidoperated valve to release the pressure within the clutch. Such a valve might be under control of a time delay means to reclose the valve after a definite time period from closing of the switch by the power control lever. Alternatively, the switch operated by the power control lever might be such as to respond to significant or sudden movements of the control lever in a power increasing direction rather than to full travel. Other devices responsive to engine acceleration are known and could be employed. However, the mechanism described is simple and has been tried in practice as a means to control the power transfer valve of the Flanigan et al. patent.

While emphasis in the description of my invention has been put on gas-coupled gas turbine engines, and the invention is probably more important and valuable in connection with such engines, it is applicable to single shaft engines. A single shaft engine might be the same as that illustrated in FIG. 1 with the clutch 35 permanently locked up, or alternatively with the two turbines 7 and 8 integrated into a single turbine which is constantly coupled to the compressor and to the power transmission 16. Acceleration of such a single shaft engine would also be improved by unloading from the engine any auxiliary devices the drive of which can be temporarily interrupted.

It will be apparent to those skilled in the art that I have disclosed an arrangement which, by reducing unnecessary loads on the turbine during acceleration, will facilitate acceleration and thereby improve the operating characteristics of a vehicle powered by the gas turbine engine.

The detailed description of the preferred embodiment of the invention for the purpose of explaining the principles thereof is not to be considered as limiting or restricting the invention, since many modifications may be made by the exercise of skill in the art.

I claim:

1. A gas turbine engine comprising, in combination, a compressor, turbine means connected to drive the compressor and connectable to drive an external load, combustion apparatus connected in flow circuit between the compressor and the turbine means, means for supplying fuel to the combustion apparatus including a settable fuel control, and power-consuming auxiliaries driven by the turbine means in conjunction with the compressor, characterized by the combination therewith of a disengageable clutch means between the said auxiliaries and the turbine means providing the sole power input from the engine to the said auxiliaries, and control means responsive to resetting of the fuel control to accelerate the turbine means effective to disengage the clutch temporarily so that the said auxiliaries are normally driven by the turbine means and are not driven while the clutch is disengaged.

2. A gas turbine engine comprising, in combination, a compressor, turbine means connected to drive the compressor and connectable to drive an external load, combustion apparatus connected in flow circuit between the compressor and the turbine means, means for supplying fuel to the combustion apparatus including a settable fuel control, and power-consuming auxiliaries driven by the turbine means in conjunction with the compressor, characterized by the combination therewith of a disengageable clutch means between the said auxiliaries and the turbine means providing the sole power input from the engine to the said auxiliaries, and control means responsive to resetting of the fuel control to accelerate the turbine means effective to disengage the clutch during acceleration of the turbine means so that the said auxiliaries are normally driven by the turbine means and are not driven while the clutch is disengaged.

3. A gas turbine engine comprising, in combination, a compressor, first turbine means connected to drive the compressor, second turbine means connectable to drive an external load, combustion apparatus connected in flow circuit between the compressor and the turbine means, means for supplying fuel to the combustion apparatus including a settable fuel control, and power-consuming auxiliaries driven by the first turbine means in conjunction with the compressor, characterized by the combination therewith of a disengageable clutch means between the said auxiliaries and the first turbine means providing the sole power input from the engine to the said auxiliaries, and control means responsive to resetting of the fuel control to accelerate the first turbine means effective to disengage the clutch temporarily during acceleration of the first turbine means so that the said auxiliaries are normally driven by the turbine means and are not driven while the clutch is disengaged.

* * * * *